US010663614B1

(12) United States Patent
Wiegert et al.

(10) Patent No.: US 10,663,614 B1
(45) Date of Patent: May 26, 2020

(54) MAGNETIC ANOMALY SENSING SYSTEM USING TWO TRIAXIAL MAGNETOMETER SENSORS

(71) Applicants: Roy F. Wiegert, Panama City, FL (US); Kurt A. Giardina, Panama City, FL (US)

(72) Inventors: Roy F. Wiegert, Panama City, FL (US); Kurt A. Giardina, Panama City, FL (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 118 days.

(21) Appl. No.: 15/669,164

(22) Filed: Aug. 4, 2017

(51) Int. Cl.
| | |
|---|---|
| *G01V 3/165* | (2006.01) |
| *B63G 7/06* | (2006.01) |
| *G01V 3/08* | (2006.01) |

(52) U.S. Cl.
CPC ............... *G01V 3/165* (2013.01); *B63G 7/06* (2013.01); *G01V 3/08* (2013.01)

(58) Field of Classification Search
CPC .......... G01V 3/165; G01V 3/081; G01V 3/15; G01V 3/08; G01V 3/16; G01R 33/022; G01R 33/00; G01R 33/0206; B63G 7/06
See application file for complete search history.

(56) References Cited

U.S. PATENT DOCUMENTS

| 6,476,610 B1 * | 11/2002 | Wiegert | ................... | B63G 7/06 |
| | | | | 324/225 |
| 6,841,994 B1 * | 1/2005 | Wiegert | ................... | G01V 3/15 |
| | | | | 324/244 |
| 7,342,399 B1 * | 3/2008 | Wiegert | ................... | G01P 3/66 |
| | | | | 324/207.11 |
| 7,932,718 B1 * | 4/2011 | Wiegert | ................. | G01V 3/081 |
| | | | | 324/245 |

* cited by examiner

*Primary Examiner* — Daniel R Miller
(74) *Attorney, Agent, or Firm* — James T. Shepherd (57) ABSTRACT

A magnetic anomaly sensing system and method uses two triaxial magnetometer (TM) sensors arranged in a one-dimensional array with the sensors' magnetic sensing axes being parallel to one another. The sensors are spaced-apart from one another along one of the sensing axes by a distance D with a midpoint between the sensors along the one sensing axis being located a distance Z from a reference datum. A processor implements an iterative process to include generating scalar magnitudes of a magnetic anomaly field measured at each of the sensors where the magnetic anomaly field is associated with a magnetic object. A scalar range from the sensors to the magnetic object is generated based on the distance D, the distance Z, and the scalar magnitudes. A magnetic dipole moment of the magnetic object is generated using the scalar range and the scalar magnitudes.

8 Claims, 4 Drawing Sheets

MAGNETIC ANOMALY SENSING SYSTEM USING TWO TRIAXIAL MAGNETOMETER SENSORS

ORIGIN OF THE INVENTION

The invention described herein was made in the performance of official duties by employees of the Department of the Navy and may be manufactured, used, licensed by or for the Government for any governmental purpose without payment of any royalties.

FIELD OF THE INVENTION

The invention relates generally to magnetic sensing systems, and more particularly to a magnetic anomaly sensing system and method that only requires two triaxial magnetometer sensors to detect, localize, classify and/or track moving magnetic objects.

BACKGROUND OF THE INVENTION

There are many potential military and commercial applications for an improved (i.e., longer-range and more economical) passive magnetic sensing system that can detect, track and measure the DC magnetic anomaly fields of moving magnetic objects or "targets" in real-time. The word "passive" indicates that the magnetic sensing system does not produce magnetic anomaly fields but only detects (and processes) the magnetic anomaly field that emanates from a target's inherent magnetic signature. The magnetic signatures stem from ferrous materials that are contained in the physical structure of a target.

Targets of interest that produce detectable magnetic signatures include watercraft such as naval vessels, and land vehicles such as cars, trucks or military tanks. Frequently, the presence, location, state of motion, and magnetic signature of these targets must be determined. Different types of targets typically will have different magnetic signatures that can be correlated with the target's ferrous structure. Thus, measurements of a target's magnetic signature can be used to classify the target. However, the physical nature of magnetic anomaly fields (i.e., a rapid reduction in magnetic field strength with distance) has limited the effective range of current magnetic anomaly sensing-based systems.

Currently, point-by-point "detection, localization and classification" (DLC) of magnetic objects generally requires a number of vector magnetic sensors that are configured as magnetic gradiometers. A gradiometer measures magnetic gradients, i.e., the rates of change of magnetic fields with distance. It is known in the art that passive magnetic detection and ranging of moving targets can be achieved by using a stationary magnetic sensing system having a combination gradiometer/magnetometer that measures five independent gradient tensor components and at least one vector field component of the target's magnetic anomaly field. However, because of the limitations of conventional prior art approaches with regard to their sensing system embodiments and signal processing methods, they have not produced a practical long-range DLC and/or tracking system.

Several advancements in magnetic-based DLC and tracking are disclosed in U.S. Pat. No. 7,342,399 (i.e., "the '399 patent" as it also will be referred to hereinafter) where a novel gradiometer-based system for tracking a magnetic object is disclosed. The '399 patent teaches an improved magnetic anomaly sensing-based system for tracking and classifying magnetic objects. In particular, the '399 patent describes a magnetic anomaly gradient sensing system based on the teachings in U.S. Pat. Nos. 6,476,610 and 6,841,994.

U.S. Pat. No. 6,476,610 (i.e., "the '610 patent" as it will also be referred to hereinafter) disclosed a novel magnetic gradiometer and signal processing concept denoted as "Scalar Triangulation and Ranging" (STAR) for target localization from maneuverable sensing platforms. The prior art STAR concept uses unique, rotationally invariant scalar "contractions" of magnetic gradient tensor components to "triangulate" relative distances to a target. Within the target-detection distance of a STAR-type gradiometer, the scalar triangulation process does not directly depend on the target's magnetic dipole signature. Thus, a STAR-type sensing technology can track a magnetic target even as its magnetic signature changes due to the target's motion in the Earth's magnetic field.

U.S. Pat. No. 6,841,994 (i.e., "the '994 patent" as it will also be referred to hereinafter) disclosed significant improvements to the STAR gradiometer design and method that better determine the range, relative bearing and magnetic signature of a stationary target from a mobile sensing platform. The '399 patent discloses a unique application of the '994 patent's magnetic gradient based STAR method that can be used to detect a moving magnetic object, and accurately determine the object's position and changes in its position, velocity and magnetic moment signature while compensating for the aspherical nature of the magnetic object's gradient contraction contours. The '399 patent also discloses a magnetic anomaly sensing system that can be used to remotely align or point an external device or system at a moving magnetic object. Thus, the '399 patent disclosed an improved magnetic gradient sensing based STAR technology that can overcome the limitations of prior art technologies and detect, track and measure the DC magnetic anomaly fields of moving magnetic objects or "targets" in real-time.

The tracking technology disclosed in the '399 patent is a relatively short-range technology because it uses magnetic gradient based methods to track and classify magnetic targets. Note that all magnetic gradiometer based sensing systems are relatively short-range systems since magnetic gradient signals are proportional to the inverse fourth power of distance from a target and very rapidly decrease to a sensor system's noise level as sensor-to-target distance increases. In addition, STAR gradiometer-based sensing systems generally require seven or eight "triaxial magnetometer" (TM) type vector magnetic field sensing elements. While these multiple-TM arrays enhance the effectiveness of a STAR-type gradiometer, they also increase the physical size, complexity and cost of the technology and detract from its practical usage.

Recently, U.S. Pat. No. 7,932,718 disclosed a magnetic anomaly sensing system and method using at least four triaxial magnetometer (TM) sensors. Each TM sensor has orthogonal X, Y, Z magnetic sensing axes such that the basic four TM sensor system produces 12 vector magnetic field (or "B-field" as it is known) equations, i.e., four $B_X$ equations, four $B_Y$ equations, and four $B_Z$ equations. The system of 12 vector equations are readily used to solve for 6 unknowns, i.e., the magnetic signature M along each of X, Y, Z axes and the X, Y, Z coordinates of the target generating the magnetic signature. The excess number of available independent equations relative to the number of unknowns supports the use of a conventional least squares minimization for the non-linear X, Y and Z followed by a linear solution for the magnetic signature components $M_X$, $M_Y$ and $M_Z$. The non-linear squared and cubic powers of the X, Y and Z terms in the classical vector equations produces several solutions at each TM sensor. However, some of the solutions are undesirable because they can occur in a mirrored quadrant where there is no target and other solutions are undesirable because they are imaginary (complex). While arranging at least four TM sensors in different planes of reference combats the above problems, it does so at the expense of system size, weight and cost.

SUMMARY OF THE INVENTION

Accordingly, it is an object of the present invention to provide a passive magnetic anomaly sensing system and method.

Another object of the present invention is to provide a longer-range magnetic anomaly sensing system that uses a small sensor package.

Other objects and advantages of the present invention will become more obvious hereinafter in the specification and drawings.

In accordance with the present invention, a magnetic anomaly sensing system and method are provided. The approach uses just two triaxial magnetometer (TM) sensors with each of the TM sensors having X,Y,Z magnetic sensing axes. The TM sensors are arranged in a one-dimensional array with respective ones of the X,Y,Z magnetic sensing axes being mutually parallel to one another in the one-dimensional array. The two TM sensors are spaced-apart from one another along one of the X,Y,Z sensing axes by a distance D, wherein a midpoint between the two TM sensors along the one X,Y or Z sensing axis is located a distance Z from a reference datum. A processor coupled to the two TM sensors implements an iterative process to include generating scalar magnitudes of a magnetic anomaly field measured at each of the two TM sensors where the magnetic anomaly field is associated with a magnetic object. A scalar range from the two TM sensors to the magnetic object is generated based on the distance D, the distance Z, and the scalar magnitudes. A magnetic dipole moment of the magnetic object is generated using the scalar range and the scalar magnitudes.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Prior to describing the present invention's novel two-sensor approach to magnetic target detection using the magnitudes of a magnetic anomaly field, some technical background related to magnetic anomaly sensing will be provided below. In general, the design and operation of magnetic sensing systems for "detection, localization and classification" (DLC) of magnetically polarized objects use the following phenomena:

The vector magnetic fields (B) that emanate from a magnetic object's magnetic moment (i.e., magnetic signature (M)) produce relatively small, short-range "magnetic anomalies" within the Earth's magnetic background field ($B_E$). In principle, magnetic anomaly sensing systems can measure and process B-field data to detect the presence of a magnetic target, locate its position in space, and classify the target in terms of its magnetic signature M.

The relatively large, and locally nearly uniform (over short distances of hundreds of meters or less) magnetic induction field of Earth ($B_E$) permeates all space around the planetary surface. The $B_E$ field may induce much of an object's net magnetic signature M that is the source of an object's magnetic anomaly field B. However, the earth's magnetic field also complicates the process of DLC of magnetic objects.

Figure 1:
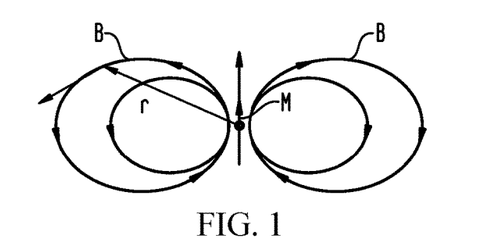
FIG. 1 is a qualitative sketch illustrating magnetic lines of force of a vector magnetic dipole field.

Magnetic DLC uses the well-known dipole equation $$B(r,M)=(\mu/4\pi)[3(M\cdot r)r/r^5-M/r^3] \quad (1a)$$

where the units of the magnetic field B are tesla (T), "r" is the object's location vector in meters (m), "M" its magnetic dipole moment in amperes (A) meters squared or Am$^2$, $\mu$ is the magnetic permeability of the surrounding media and is approximately equal to $4\pi \times 10^7$ Tm/A, and $\pi=3.14159$. FIG. 1 is a qualitative sketch showing the relation of the vector field "lines of force" of B to r and M. In order to perform point-by-point localization and classification of a magnetic dipole type target, a magnetic sensor system (or "magnetometer") must collect sufficient B-field data to determine six unknowns; namely, three vector components of target location r and three vector components of magnetic dipole moment (or "signature") M. The components of M can be used to magnetically classify the target.

In a Cartesian coordinate system with unit vectors i,j,k along the XYZ directions, the three components of B can be written in terms of the six independent scalar components of r and M ($r_X$, $r_Y$, $r_Z$ and $M_X,M_Y,M_Z$) as:

$$B_X=(\mu/4\pi)[(3r_X^2-r^2)M_X+3r_Xr_YM_Y+3r_Xr_ZM_Z]r^{-5}$$

$$B_Y=(\lambda/4\pi)[3r_Xr_YM_X+(3r_Y^2-r^2)M_Y+3r_Yr_ZM_Z]r^{-5}$$

$$B_Z=(\lambda/4\pi)[3r_Xr_ZM_X+3r_Yr_ZM_Y+(3r_Z^2-r^2)M_Z]r^{-5} \quad (1b)$$

Note that these equations are nonlinear with regard to components of r and linear with regard to components of M. The scalar magnitudes $B=|B|$, $r=|r|$ and $M=|M|$ are given by:

$$B=[(B_X)^2+(B_Y)_2+(B_Z)^2]^{0.5}$$

$$r=[(r_X)^2+(r_Y)^2+(r_Z)^2]^{0.5}$$

$$M=[(M_X)^2+(M_Y)^2+(M_Z)^2]^{0.5}$$

When tracking moving magnetic targets, the following features of the magnitude B of the magnetic anomaly field are applied:

The scalar magnitude B is a rotationally invariant and robust quantity.

The B-field can be mathematically expressed in a form that is analogous to a central potential type scalar field. Specifically, $B=(\mu/4\pi)k_B Mr^{-3}$ where $k_B$ is a dimensionless "asphericity parameter" or a number ($1 \leq k_B \leq 2$) that characterizes the B-field's departure from perfect spherical symmetry.

For a magnetic dipole target, contours of constant B (indicated by the dashed lines in FIG. 2A) form a family of concentric prolate spheroidal "equipotential-type" surfaces that are centered on the dipole. For a given constant B, the ratio of the spheroid's major (vertical) axis to its minor (horizontal) axis is 1.26 to 1.

As will be discussed below, these features of the B-field are analogous to those of the "gradient contraction field" ($C_T$) disclosed in the aforementioned patents with one major difference. Namely, $B \propto 1/r^3$ while $C_T \propto 1/r^4$. Therefore, the use of magnetic anomaly magnitudes as primary DLC parameters instead of the gradient contraction type parameters used by the prior art STAR technologies increases the range of STAR technology-based target DLC and/or tracking.

As mentioned above, the Earth's field $B_E$ complicates the process of measuring the components of B due to a magnetic anomaly or target. Since a target's B field components are convolved with the Earth's main field $B_E$, a magnetic sensing system actually performs measurements of a total field ($B_T$) that is given by:

$$B_T=(B_E+B)=(B_{EX}+B_X)i+(B_{EY}+B_Y)j+(B_{EZ}+B_Z)k \quad (2)$$

The Earth's field $B_E$ makes it difficult to effectively measure/discriminate between $B_X$, $B_Y$ and $B_Z$ because of the following:

At distances of a few meters from a typical target, its B-field magnitude is relatively very small (i.e., on the order of $10^{-9}$ tesla or 1 nano-tesla (nT)) or less. Thus, measurement of B-fields requires highly sensitive field-sensing instruments.

$B_E$ has a magnitude $B_E$ that varies from about 30,000 nT at the Earth's equator to about 60,000 nT at the Earth's poles. Thus $B_E$ is many orders of magnitude larger than a target's B, and can interfere with high sensitivity measurements of B unless the sensing system has a very high "dynamic range" (i.e., well over 100 dB) and/or provides an embodiment with means and methods to greatly reduce the effects of $B_E$.

Due to solar wind and other effects, the XYZ components of $B_E$ may unpredictably change by tens or hundreds of nano-tesla over time periods of minutes. These non-target-related "temporal" effects must somehow be compensated for, or they will greatly interfere with measurement of the XYZ components of B.

In order to overcome these difficulties, means and methods are employed to enable accurate measurement and discrimination of very small XYZ components of B that are convolved with the relatively very large and time-dependent Earth field $B_E$. Although primary DLC modalities use B-field magnitudes, magnetic gradient-derived quantities are also used to: i) reduce the effects of temporal variations in the components of $B_E$, and ii) provide a complementary DLC modality.

It is generally known in the art of magnetic sensing that the spatial rate of change of $B_E$ with distance, i.e., the gradient of $B_E$, or $\nabla B_E$, is relatively very small and does not change appreciably with time. Typically, $|\nabla B_E|$ is approximately 0.02 nT/meter. Therefore, the temporal effects of $B_E$ can be greatly reduced by using sensor system embodiments that measure magnetic gradients.

The gradient of the vector field ($G=\nabla B$) is a second-rank tensor whose matrix elements are given by:

$$(\nabla B)_{ij} \equiv G_{ij} \equiv \partial B_i/\partial r_j = -3(\mu/4\pi)[M \cdot r(5r_i r_j - r^2 \delta_{ij}) - r^2(r_i M_j + r_j M_i)]r^{-7} \quad (3)$$

The "i" and "j" sub indices represent XYZ components and $\delta_{ij}$ is the "Kronecker delta function". For $i=j$, $\delta_{ij}=1$; and, for $i \neq j$, $\delta_{ij}=0$. Thus, $\delta_{XX}=1$ and $\delta_{XY}=0$, etc. The scalar magnitude ($C_T$) of the magnetic gradient tensor (G) is given by the square root of the sum of squares of the tensor's components. In the aforementioned patents, the magnitude $G=|G|$ is denoted as "gradient contraction". Thus, $$C_T=[\Sigma(G_{ij})^2]^{0.5}=[(\partial B_x/\partial x)^2+(\partial B_x/\partial y)^2+(\partial B_x/\partial z)^2+(\partial B_y/\partial x)^2+(\partial B_y/\partial y)^2+(\partial B_y/\partial z)^2+(\partial B_z/\partial x)^2+(\partial B_z/\partial y)^2+(\partial B_z/\partial z)^2]^{0.5} \quad (4)$$

which can be approximated by the following $$[(\Delta B_x/\Delta x)^2+(\Delta B_x/\Delta_y)^2+(\Delta B_x/\Delta z)^2+(\Delta B_y/\Delta x)^2+(\Delta B_y/\Delta y)^2+(\Delta B_y/\Delta z)^2+(\Delta B_z/\Delta x)^2+(\Delta B_z/\Delta y)^2+(\Delta B_{z/\Delta z})^2]^{0.5}$$

As discussed in detail in the '994 and '399 patents, the contents of which are hereby incorporated by reference, the gradient-contraction-based magnetic Scalar Triangulation and Ranging (STAR) method for real-time, point-by-point DLC of magnetic targets is based on the following features of $C_T$:

The scalar magnitude $C_T$ is a rotationally invariant and robust quantity.

The $C_T$-field can be mathematically expressed in a form that is analogous to a central potential type scalar field, that is: $C_T=(\mu/4\pi)k_c Mr^{-4}$ where $k_c$ is a dimensionless "asphericity parameter" or number ($4.24 \leq k_c \leq 7.15$) that characterizes the $C_T$-field's departure from perfect spherical symmetry.

For a magnetic dipole target, contours of constant $C_T$ form a family of concentric prolate spheroidal "equipotential-type" surfaces that are centered on the dipole. As indicated in FIG. 3, for a given contour of constant $C_T$, the ratio of the spheroid's major axis to its minor axis is $(7.15/4.24)^{0.25}$ or about 1.14 to 1.

Figure 3:
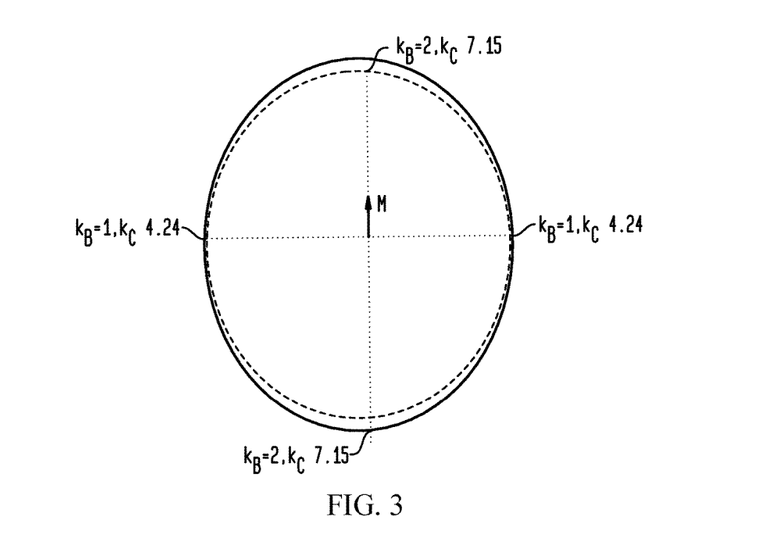
FIG. 3 is a semi-quantitative two-dimensional graphic view comparing the asphericities of a single contour of constant magnetic anomaly field magnitude and a single contour of constant magnetic gradient contraction associated with a magnetic dipole field.

FIG. 3 graphically compares the geometrical properties and asphericity parameter values of the $C_T$-field (illustrated with a dashed-line curve) to those of the B-field (illustrated by a solid-line curve). Note that the B field features discussed above are qualitatively analogous to those of the $C_T$ field that provides the basis for the STAR methods disclosed in the above-mentioned patents and patent application. Therefore, an innovative use of B-type parameters facilitates the following:

Application of a new, non-gradiometric Scalar Triangulation and Ranging (STAR) approach for detection, localization and classification (DLC) of magnetic targets that can apply, with appropriate modifications, the general STAR formalisms that were disclosed in the aforementioned patents.

Longer-range DLC and tracking of a magnetic target.

Simpler sensor system embodiments because only one triaxial magnetometer (TM) sensor is required to develop a three-independent-component B-type parameter while each $C_T$ parameter requires at least five independently measured gradient components that must be obtained from at least three (and preferably four) non collinear TM sensors. Thus, using B-type parameters provides longer-range DLC with fewer TM sensors.

Figure 2A:
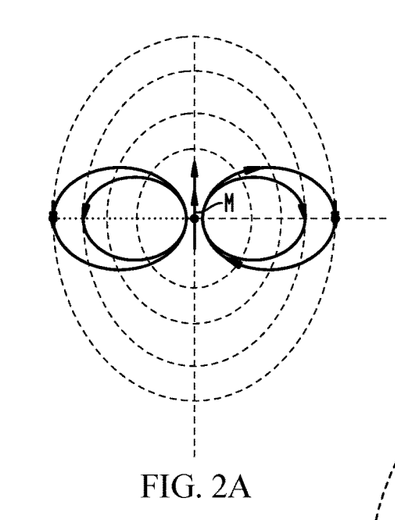
FIG. 2A is a qualitative two-dimensional graphic view of a magnetic object's magnetic dipole field and contours of constant magnetic anomaly field magnitudes associated with the magnetic dipole field.

With continuing reference to FIG. 2A, the geometrical properties of the B-field are qualitatively illustrated where contours of constant B (represented by dashed contour lines) form concentric prolate spheroidal surfaces that enclose a source (e.g., target dipole signature M) of the magnetic anomaly field. The polar axis of the dipole field is illustrated by the vertical dashed line and the field's transverse or "equator" axis is illustrated by the horizontal dashed line. Magnetic lines of force of the dipole field are illustrated by curved solid lines.

Figure 2B:
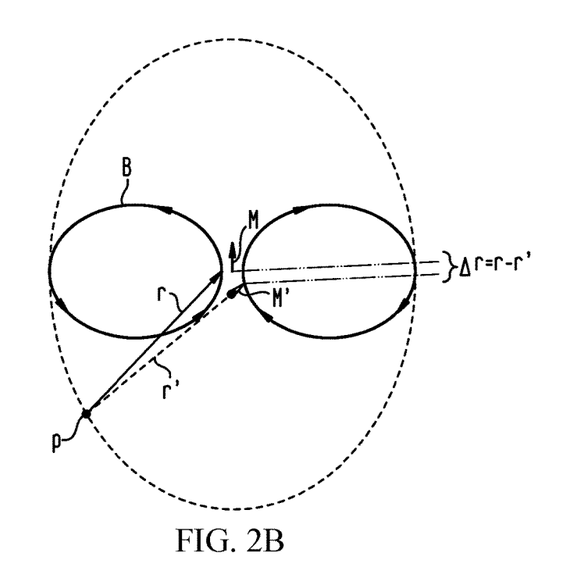
FIG. 2B is a qualitative two-dimensional graphic view of a single contour of constant magnetic anomaly field magnitude illustrating the ranging and magnetic signature measurement errors introduced by the aspherical nature of the constant magnetic anomaly field magnitude contour.

Additional reference will now be made to FIG. 2B where only one of the constant B contours is illustrated for clarity. At a given sensor-to-target distance "r", B is primarily a function of the magnetic dipole moment M of the target, distance r, and the dimensionless asphericity parameter "$k_B$". The $k_B$-parameter characterizes the variance of the B "potential field" from true spherical symmetry. Specifically, for media with constant magnetic permeability $\mu$, $B=k_B(\mu/4\Pi)M/r^3$ where calculations show that $k_B$ slowly varies from exactly 2 for points on the dipole axis to 1 for points on the equator. For contours of constant magnetic anomaly magnitude, the ratio of the diameter at dipole axis to a diameter at the equator is $(2)^{1/3}$ to 1, that is, about 1.26 to 1.

The aspherical nature of the constant B contours can cause inaccuracies or "asphericity errors" similar to the inaccuracies in the $C_T$-based STAR methods that were described in the '399 patent. For example, referring again to FIG. 2B, for a magnetometer sensor position "p" located between the dipole axis and the equator, application of the invention's B-field-based STAR method will produce a measured vector position or range r' and a measured target dipole moment M' that can differ slightly from the true values of range r to target T and the dipole moment M thereof.

Figure 4:
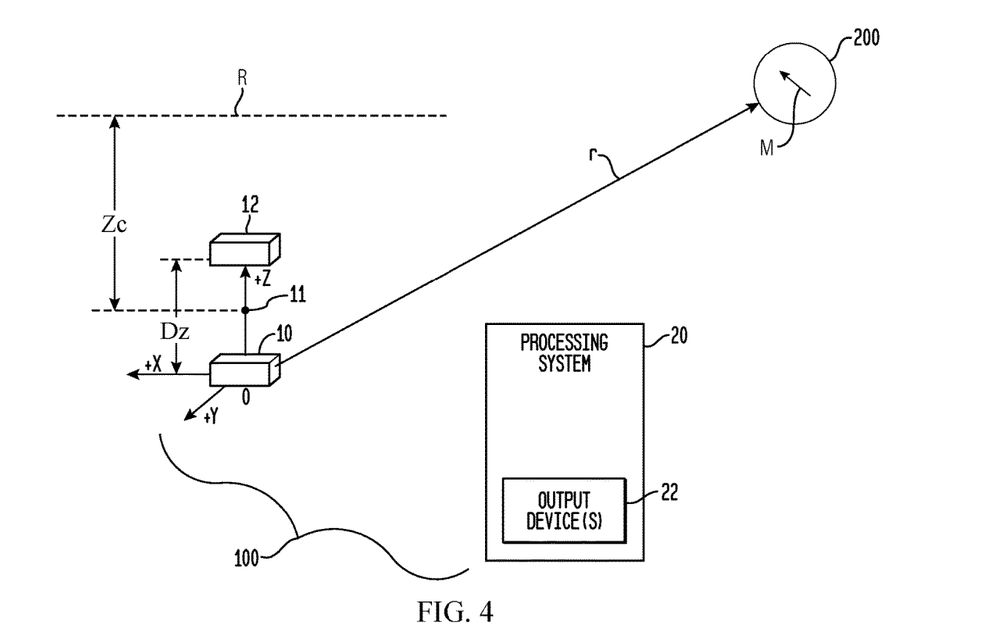
FIG. 4 is a schematic view of a two triaxial magnetometer (TM) system for tracking a moving magnetic target in accordance with an embodiment of the present invention.

Referring now to FIG. 4, a magnetic anomaly detection and ranging (MADAR) system 100 for tracking a moving magnetic target 200 in accordance with an embodiment of the present invention is shown. The term "target" as used herein refers to any object whose movement is of interest such that the tracking thereof is desirable. Magnetic target 200 is any natural or man-made object that moves on the ground, in the air, or in the water, with the object having an inherent magnetic signature owing to the ferrous material(s) that are included in the object's physical structure. Target 200 can be a self-propelled vehicle, a launched projectile without it's own propulsion, etc., that is moving along a path or trajectory at a constant or accelerating/decelerating velocity "v" thereby making the velocity (and magnetic signature) changeable in direction and magnitude.

At the heart of tracking system 100 is a magnetic anomaly sensing system that uses a one-dimensional magnetic sensor array that can passively measure magnetic anomaly field components ($B_X$, $B_Y$, $B_Z$) associated with the target's magnetic dipole signature M, and then convert the data to magnetic anomaly field scalars (B) where $B=[(B_X)^2+(B_Y)^2+(B_Z)^2]^{0.5}$. The one-dimensional array is defined by triaxial magnetometer (TM) sensors 10 and 12 where each of the TM sensors has essentially the same characteristics as those disclosed in detail in U.S. Pat. No. 6,841,994. However, the present invention applies data processing methods that are significantly different than any of those used in the previously-referenced patents.

As is known in the art, each of the TM sensors has X,Y,Z magnetic sensing axes. In the present invention, the TM sensors are arranged in a one-dimensional array with respective ones of the X,Y,Z magnetic sensing axes being mutually parallel to one another. In the illustrated embodiment, TM sensors 10 and 12 are aligned in the Z-direction and separated by a distance $D_Z$. However, it is to be understood that TM sensors 10 and 12 can be aligned and separated in the X-direction or the Y-direction without departing from the scope of the present invention. For the remainder of the description, the processing methodology and equations used therein will assume that the TM sensors are aligned and separated in the Z-direction. Typically, TM sensors 10 and 12 would be mounted in a structure or device (not shown) that fixes their relative positions and orientations. A processing system 20 coupled to TM sensors 10 and 12 generates magnetic anomaly field magnitudes, gradient tensor components, and corresponding complete gradient contraction(s). In general, processing system 20 will include one or more digital processor(s) and one or more output device(s) 22. For clarity of illustration, signal lines coupling TM sensors 10 and 12 to processing system 20 are not shown.

The analog or digital outputs of the TM sensors are provided to processing system 20 which implements new processing methods that allow the present invention to perform tracking of moving magnetic targets while using only two TM sensors 10 and 12. Processing system 20 includes signal processing hardware and software that can use the TM sensors' data to simultaneously develop all B-field components. The ultimate result generated by the processing system is values indicative of a moving target's localization vector r and its magnetic signature vector M. These values are presented in human-discernable format(s) (e.g., audio and/or visual) and/or computer-discernable format(s) by output device(s) 22.

Each TM sensor 10 and 12 measures three orthogonal (XYZ) vector components of a total magnetic field $B_{TI}$ that is comprised by the vector sum of the Earth's field $B_{EI}$ and the magnetic anomaly field $B_I$ associated with magnetic target 200. The midpoint between TM sensors 10 and 12 in the Z-direction is indicated by reference numeral 11. The origin (O) of the array's XYZ coordinates is assumed to be located at the geometric center of the field-sensing elements of TM sensor 10.

TM sensors 10 and 12 provide the data used by the present invention's improved localization and discrimination methods. Each TM sensor measures the XYZ components of a total vector magnetic field ($B_T$) given by the vector sum of the Earth's field $B_E$ and any magnetic anomaly field B at its location. Each TM sensor constitutes a vector total field magnetometer whose data are combined in processing system 20 and used to calculate a $B_I$ parameter at that sensor. The outputs of the processing system can be provided to one or more output devices 22 that can be incorporated with or separated from processing system 20 without departing from the scope of the present invention.

Each TM sensor measures XYZ components of a total magnetic field $B_{TI}$ comprised by the vector sum of the Earth's field ($B_E$) plus the magnetic anomaly field corresponding to point I, that is $B_I$. Processing system 20 subtracts previously stored calibration values of $B_{EI\,X}$, $B_{EI\,Y}$, $B_{EI\,Z}$ from $B_{TI\,X}$, $B_{TI\,Y}$, $B_{TI\,Z}$ to obtain anomaly field components $B_{I\,X}$, $B_{I\,Y}$, $B_{I\,Z}$ corresponding to each I-th sensor.

Next, processing system 20 uses the $B_{I\_X}$, $B_{I\_Y}$, $B_{I\_Z}$ values to calculate a total magnetic anomaly field magnitude $B_I$ at each I-th point of the one-dimensional array. Since the X, Y and Z-axes associated with TM sensors 10 and 12 are typically parallel to one another, the pair of TM sensors forms a single-axis gradiometer aligned in each of the X, Y and Z directions. The data from the single-axis gradiometers are used to detect and compensate for temporal variations of the XYZ components of $B_E$, and calculate at least one gradient contraction magnitude that can be used in the determination of distance to target 200.

Briefly, the present invention uses only two TM sensors and a combination of processing steps to produce an overlapping solution space to generate a solution (i.e., target detection, localization, classification, and tracking) that is spatially correct (i.e., no mirroring) and satisfies the classical equations described above. The present invention's reduction in number of TM sensors reduces the overall size, weight, cost, and power requirements of the system.

Figure 5:
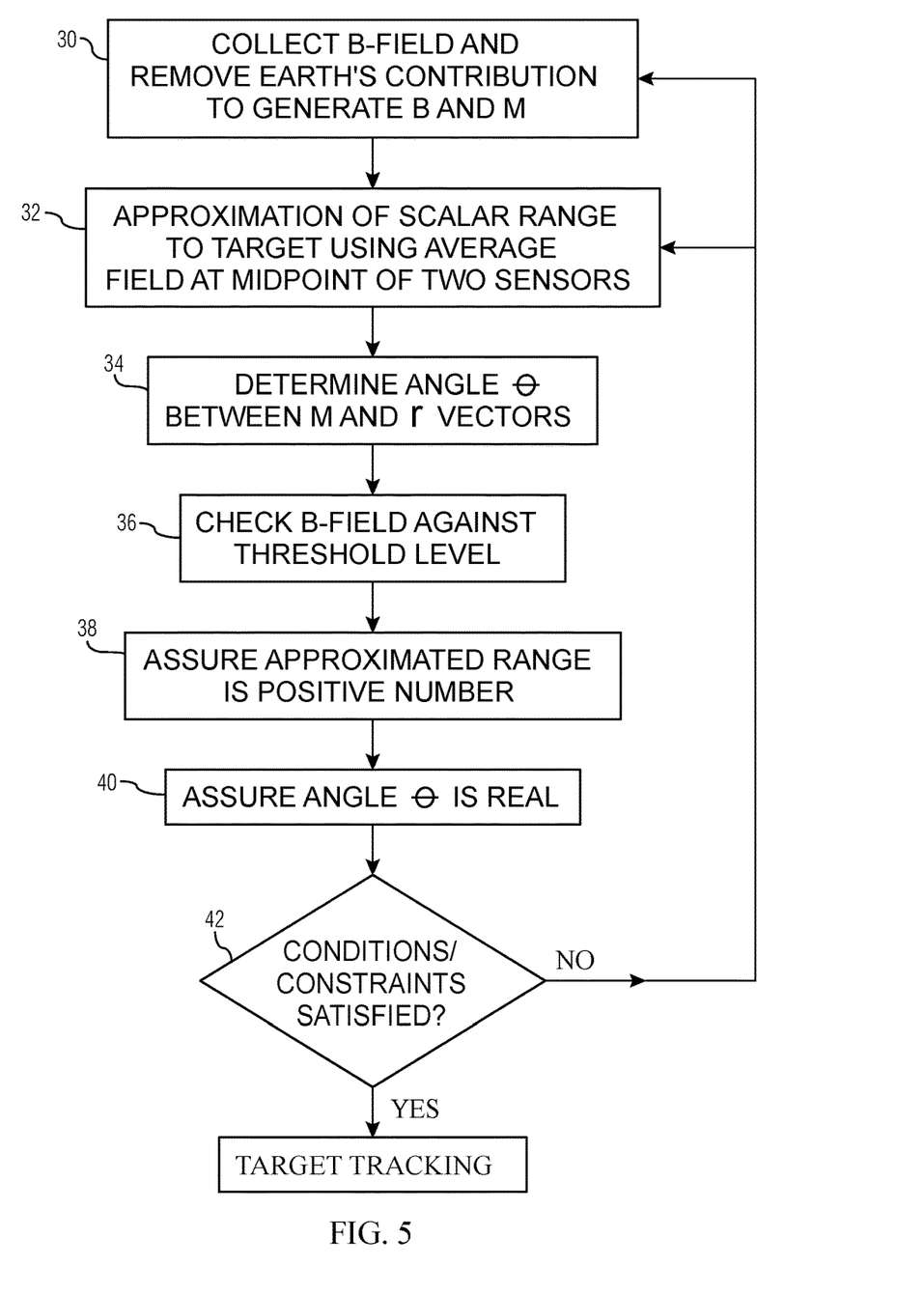
FIG. 5 is a simplified flowchart of the general process steps used for target detection and localization in accordance with an embodiment of the present invention.

An iterative process is used in the present invention to solve for target location vector r and its magnetic signature vector M. The basic steps of the iterative process, depicted in FIG. 5, use measured B-field data in multi-mode equations in order to solve for the target location vector r and its magnetic signature vector M. In solving the well-known dipole equation (1a) described above, the present invention begins at step 30 with the collection of B-field data and removal of the Earth's field $B_E$ contributions described in detail in U.S. Pat. No. 7,932,718. Accordingly, step 30 generates the magnetic field density vector B as a function of the vector dipole moment or magnetic signature M. Next, at step 32, the present invention's two-sensor approach generates an approximation of the scalar range r to the target. The approximation is based on the following range approximation equation:

$$r \approx \sqrt{1.5 * D_z * Z_c * \left[\frac{\sum B}{\Delta B}\right]}$$

where $D_Z$ is the distance between sensors 10 and 12 (FIG. 4),
$Z_C$ is the distance from a selected datum reference R to the midpoint P (indicated by reference numeral II in FIG. 4) between sensors 10 and 12, and
$\Sigma B/\Delta B$ is the sum of B-field magnitudes divided by the difference in the B-field magnitudes.

By way of an illustrative example, when system 100 is deployed underwater, the datum reference R can be the water's surface with midpoint P being a depth below the water's surface.

The partial derivatives $B_X$, $B_Y$ and $B_Z$ of the magnetic field vector B can be written as $$\frac{\partial B_x}{dz} = \frac{\Delta B_x}{D_z}$$

$$\frac{\partial B_y}{dz} = \frac{\Delta B_y}{D_z}$$

$$\frac{\partial B_z}{dz} = \frac{\Delta B_z}{D_z}$$

where each partial derivative is a function of the distance $D_Z$ between the sensors. Note that similar relationships would be true if the sensors were deployed in a horizontal orientation.

The present invention next applies several conditions (steps 34-40) using the results from steps 30 and 32 in combination with the partial derivatives to begin the search for the best solution of a target's X, Y, Z location and its $M_X$, $M_Y$, $M_Z$ magnetic signature. Briefly, the conditions applied in steps 34-40 place constraints on a solution to determine the solution's efficacy. In step 34, the following equation uses the results from steps 30 and 32 to determine the angle θ between the M and r vectors.

$$|B| = \frac{100|M|}{r^3}\sqrt{1 + 3(\cos\theta)^2}$$

Taking the absolute values of the B-field and the M vector is an alternative approach to the derivation of the well-known dipole equation (1a). The constant "100" converts the units of the B-field to nano Tesla.

Step 36 applies a threshold test to the magnitude $B_{mag}$ of the B-field determined from the B-field's scalar magnitudes. The value of the threshold is set to a level associated with a target of interest. Typically, the threshold level is set slightly below what would be expected from a target of interest.

The condition/constraint applied in step 38 verifies the efficacy of the approximation of range r made during step 32. More specifically, the following equation is evaluated $$1.5 * D_z * Z_c * \left[\frac{\sum B}{\Delta B}\right] > 0$$

to verify that the value under the range approximation radical above is a positive number.

The condition/constraint applied in step 40 verifies the efficacy of the angle θ determined in step 34. More specifically, the following equation is evaluated $$isReal(\theta) = \cos^{-1}\sqrt{\left(\left[\frac{r^3 * B_{mag}}{100 * M}\right]^2 - 1\right)}$$

to determine if the angle Θ is a real number.

If the conditions/constraints in steps 34-40 are met at step 42, the solution set can be passed to the target tracking portion of the process. However, if one or more of the conditions/constraints is not met at step 42, the solution set is discarded. If the threshold condition at step 36 is satisfied, step 42 returns the process to step 32 so that the values for M are re-used. However, step 42 returns the process to step 30 for a new set of magnetic field data if the threshold condition at step 36 is not satisfied.

Target classification uses the localization vector components of r from the magnetic dipole equation and the magnetic gradient equations to determine the $M_X$, $M_Y$ and $M_Z$ components of magnetic signature M. The component values of r and M can also be used in a least-squares-fit type asphericity compensation scheme that removes measurement errors (i.e., the aforementioned "asphericity errors") that can be caused by the B-potential field's departure from perfect spherical symmetry. Asphericity error compensation is described in detail in U.S. Pat. No. 7,932,718 that has been previously incorporated by reference.

Figure 6:
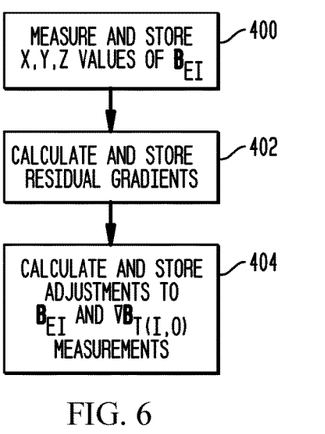
FIG. 6 is a flowchart of a calibration process used in the present invention.

In order to perform accurate DLC of a moving magnetic object, the present invention's processing system 20 must be properly calibrated with no target present and the sensor system fixed in position. With no target present, the following are true: (i) B=0, (ii) $B_T=B_E$; and (iii) $\nabla B_T=\nabla B_E$ or approximately 0. The flowchart in FIG. 6 describes the three basic steps of the calibration process. With reference also to the simple two-sensor system shown in FIG. 4, the present invention's calibration method comprises the following steps:

Step 400 measures and stores the vector total field values $B_{TI}=B_{EI}+B_I=(B_{EI\,X}+B_{I\,X})i+(B_{EI\,Y}+B_{I\,Y})j+(B_{EI\,Z}B_{I\,Z})k$ measured by each I-th TM sensor. With no target present, $B_{I\,X}=B_{I\,Y}=B_{I\,Z}=0$ and so the only field that is present to be measured/calibrated is $B_{EI}$. In particular, this step of calibration determines the values of XYZ components of Earth's field $B_{EI\,X}$, $B_{EI\,Y}$, $B_{EI\,Z}$ that are measured by each I-th TM in the array.

Step 402 determines residual gradient imbalance errors where $\nabla B_{TI\,(XYZ)}$ is approximately $\nabla B_{TI\,(XYZ)}/\Delta S_{(X,Y,Z)}$ in the XYZ directions between TM sensors 10 and 12 located at $+\Delta S_X$, $+\Delta S_Y$, $+\Delta S_Z$ and TM sensor 10 located at origin O. For example, the gradients in the $\Delta S_X$ direction are: $(B_{T1\,X}+B_{T0\,X})/\Delta S_X$, $(B_{T1\,Y}+B_{T0\,Y})/\Delta S_X$, $(B_{T1\,Z}-B_{T0\,Z})/\Delta S_X)=(B_{E1\,X}-B_{E0\,X})/\Delta S_X$, $(B_{E1\,Y}-B_{E0\,Y})/\Delta S_X$, $(B_{E1\,Z}-B_{E0\,Z})/\Delta S_X)$. Similar gradients are obtained in the $\Delta S_Y$ and $\Delta S_Z$ directions. Again, with no target present, non-zero values of the gradients indicate sensor channel imbalances that must be "calibrated out."

Step 404 calculates and stores all respective calibration adjustments for the above-determined $B_{EI\,(XYZ)}$ and $\nabla B^{EI}{}_{(XYZ)}/\Delta S_{(X,Y,Z)}$ values. The invention's calibration adjustments are used during operation of the invention to compensate the sensor for differences between "measurement channels," and discriminate between XYZ components of Earth's field $B_E$ and the XYZ components of magnetic anomaly field B.

As used herein, a "measurement channel" is defined to include the following: (i) A particular analog field-sensing element and the associated electronic circuitry of a particular TM sensor, and (ii) the corresponding analog-to-digital converter (ADC) circuitry (also commonly referred to as the ADC's channel) that converts (or, digitizes) the TM sensors' analog data to digital format. For example, the X-axis field-sensing circuitry of TM sensor 10 and the corresponding ADC circuitry that digitizes the analog data from the X-axis field-sensing element of TM sensor 10 comprise one channel of the sensor system. As is known in the art of magnetic sensing, due to typical variations in the response of electronics circuitries, prior to completion of the digitization process, different measurement channels may produce different measurements for the same value of applied B-field. Calibration basically measures and records the responses of all sensor channels to the same $B_E$ field. The calibration data can then be used by the system's processor (during sensor system operation) to enhance the accuracy of target-tracking measurements by compensating or equalizing the B-field responses of all sensor system channels. Since the channels' responses can change over time the calibration process is typically repeated periodically.

In its simplest form, the present invention can be used to just detect a magnetic target. However, in most practical applications, the above-described location and classification determination aspects of the present invention would also be utilized. Still further, the present invention can be used to track a moving magnetic target in accordance with the following description. Again referring to FIG. 4, the outputs of TM sensors 10 and 12 are provided to processing system 20. The term "output" here can mean the magnetic anomaly field components, associated magnetic anomaly scalar magnitudes, etc., developed by the sensing system as described above. However, the output of the sensing system could also be raw TM sensor data in which case processing system 20 would be equipped to generate the necessary parameters. In either case, processing system 20 continuously (e.g., at intervals of 0.1-1 seconds) generates magnetic anomaly field and magnetic gradient data. The magnetic anomaly field data can be used to (i) calibrate the sensor system, (ii) detect the target, and (ii) determine target range, velocity, acceleration and magnetic moment signature.

Figure 7:
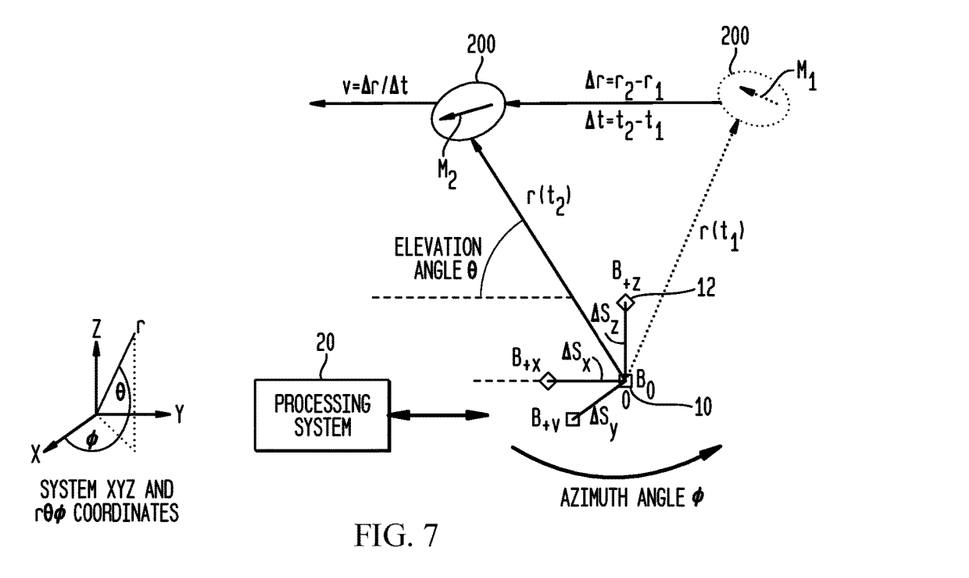
FIG. 7 is a graphic view of the $B_T$-parameters and triangulation baselines when the present invention is employed in a target-tracking mode.

The tracking aspects of the present invention will be described with reference to the example illustrated in FIG. 7. In this illustration, processing system 20 uses the magnetic anomaly field magnitudes at a time (e.g., $t_1$) when the target has been detected and the tracking system is locked onto the target. At this point, bearing, elevation and range "r" to the target, and the target's vector magnetic dipole signature "M" are determined (i.e., $r_1$ and $M_1$) at time $t_1$.

The range, bearing, elevation and magnetic signature are next determined at a second time $t_2$ when target 200 has moved some distance such that a second range $r_2$ and a second measurement of magnetic signature $M_2$ are determined. The changes in range (i.e., $r_2-r_1$) divided by the change in time (i.e., $t_2-t_1$) is indicative of the velocity $v_{1,2}$ of the target during the time interval between $t_1$ and $t_2$. The time-rate-of-change of the magnetic signature from time $t_1$ to $t_2$ is defined as $(M_2-M_1)/(t_2-t_1)$. This process can be repeated for consecutive target positions. The difference between consecutively determined velocities divided by the respective change in time is indicative of kinematic acceleration. The difference between consecutively determined magnetic signatures divided by the respective change in time is indicative of the time-derivative of the magnetic signature of the target. The present invention's ability to account for changing magnetic signatures allows it to be used to track and classify targets whose magnetic signature changes with target motion/orientation in the Earth's background field.

The origin of the system's Cartesian (XYZ) coordinates and spherical (rθφ) coordinates can be located at TM sensor 10 (as shown) or TM sensor 12. Here, the coordinates are defined so that the system's X, Y and Z-axes each contain one of the three orthogonal triangulation baselines of the array and a corresponding set of $B_1$ parameters.

As explained above, the present invention uses the $B_T$-parameters to detect, lock onto, track and classify a moving magnetic target. While tracking, the system's processor develops data corresponding to the target's elevation θ, relative bearing φ, range r, velocity v, acceleration a, and the XYZ-components of magnetic dipole moment M and ΔM/Δt, etc., as the means to classify the target and its state of rotational motion.

The present invention can also be used to control a remotely-located device in accordance with the approach disclosed in the '399 patent. Briefly, if a remote device and positioning assembly are located a distance D away from the magnetic anomaly tracking system, the tracking system determines primary target parameters $r_1$, $\Delta r_1/\Delta t$, $\Delta v/\Delta t$, $\theta_1$, $\varphi_1$ and M at its location. Using simple trigonometric relations, the primary target parameters can be correlated with distance D to provide the respective target parameters ($r_2$, $\theta_2$ and $\varphi_2$) at the location of the remote device and positioning assembly. A servo mechanism coupled to the tracking system and the remote device's positioning assembly uses the $r_2$, $\theta_2$ and $\varphi_2$ parameters to aim the device at the target. In the event that the tracking system lost its lock on a target, the last measured values of range, bearing, velocity and acceleration would be used to predict new values of the respective target-tracking variables. A variety of well-known geometric/analytical prediction schemes could be used without departing from the scope of the present invention. Thus, the tracking system is a feedback-based system that will keep forward-pointing direction of the remote unit aligned with a moving target.

The advantages of the present invention are numerous. A unique method is presented that only requires two TM sensors in order to accurately detect, localize, classify, and track a moving magnetic target. The application of a range approximation in combination with a set of conditions/constraints makes the two-sensor approach possible while assuring solution efficacy. The two-sensor system and method will result in a practical system that requires less space and power thereby decreasing system weight and cost.

Although the invention has been described relative to specific embodiments thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A magnetic anomaly sensing system, comprising:
   two triaxial magnetometer (TM) sensors with each of said two TM sensors having X,Y,Z magnetic sensing axes, said two TM sensors arranged in a one-dimensional array with respective ones of said X,Y,Z magnetic sensing axes being mutually parallel to one another in said one-dimensional array, said two TM sensors spaced-apart from one another along one of said X,Y,Z sensing axes by a distance D, wherein a midpoint between said two TM sensors along said one of said X,Y,Z sensing axes is located a distance Z from a reference datum; and
   a processor coupled to said two TM sensors for implementing an iterative process to include
   generating scalar magnitudes of a magnetic anomaly field measured at each of said two TM sensors, said magnetic anomaly field being associated with a magnetic object,
   generating a scalar range from said two TM sensors to the magnetic object, said scalar range being generated in accordance with $$\sqrt{1.5 * D_z * Z_c * \left[\frac{\Sigma B}{\Delta B}\right]}$$

where $\Sigma B/\Delta B$ is a sum of said scalar magnitudes divided by a difference of said scalar magnitudes,
   performing a plurality of condition tests using said distance D, said distance Z, said scalar range, and said scalar magnitudes
   generating a magnetic dipole moment of the magnetic object using said scalar range and said scalar magnitudes, wherein said magnetic dipole moment and said scalar range define a verified solution set when said plurality of condition tests are satisfied.

2. A magnetic anomaly sensing system as in claim 1, wherein the reference datum is the surface of a body of water.

3. A magnetic anomaly sensing system as in claim 2, wherein said two TM sensors are arranged at different depths in the body of water.

4. A magnetic anomaly sensing system as in claim 1, further comprising at least one output device coupled to said processor.

5. A magnetic anomaly sensing method, comprising the steps of:
   providing two triaxial magnetometer (TM) sensors with each of said two TM sensors having X,Y,Z magnetic sensing axes;
   arranging said two TM sensors in a one-dimensional array with respective ones of said X,Y,Z magnetic sensing axes being mutually parallel to one another in said one-dimensional array, wherein said two TM sensors are spaced-apart from one another along one of said X,Y,Z sensing axes by a distance D, and wherein a midpoint between said two TM sensors along said one of said X,Y,Z sensing axes is located a distance Z from a reference datum; and
   iteratively processing sensed data from said two TM sensors at a processor, wherein said step of iteratively processing includes the steps of
   generating scalar magnitudes of a magnetic anomaly field measured at each of said two TM sensors, said magnetic anomaly field being associated with a magnetic object,
   generating a scalar range from said two TM sensors to the magnetic object based on said distance D, said distance Z, and said scalar magnitudes, and
   generating a magnetic dipole moment of the magnetic object using said scalar range and said scalar magnitudes,
   wherein said scalar range is generated in accordance with $$\sqrt{1.5 * D_z * Z_c * \left[\frac{\Sigma B}{\Delta B}\right]}$$

where $\Sigma B/\Delta B$ is a sum of said scalar magnitudes divided by a difference of said scalar magnitudes.

6. A method according to claim 5, wherein the reference datum is the surface of a body of water.

7. A method according to claim 6, wherein said two TM sensors are arranged at different depths in the body of water.

8. A method according to claim 5, wherein said step of iteratively processing includes performing a plurality of condition tests using said distance D, said distance Z, said scalar range, and said scalar magnitudes, wherein said magnetic dipole moment and said scalar range define a verified solution set when said plurality of condition tests are satisfied.

* * * * *